March 7, 1944. W. WISK 2,343,606
MULTIMOTOR SINGLE PROPELLER AIRPLANE
Filed Sept. 17, 1941 2 Sheets-Sheet 1

INVENTOR
*Walter Wisk.*
BY *H. G. Manning*
ATTORNEY

March 7, 1944. W. WISK 2,343,606
MULTIMOTOR SINGLE PROPELLER AIRPLANE
Filed Sept. 17, 1941 2 Sheets-Sheet 2
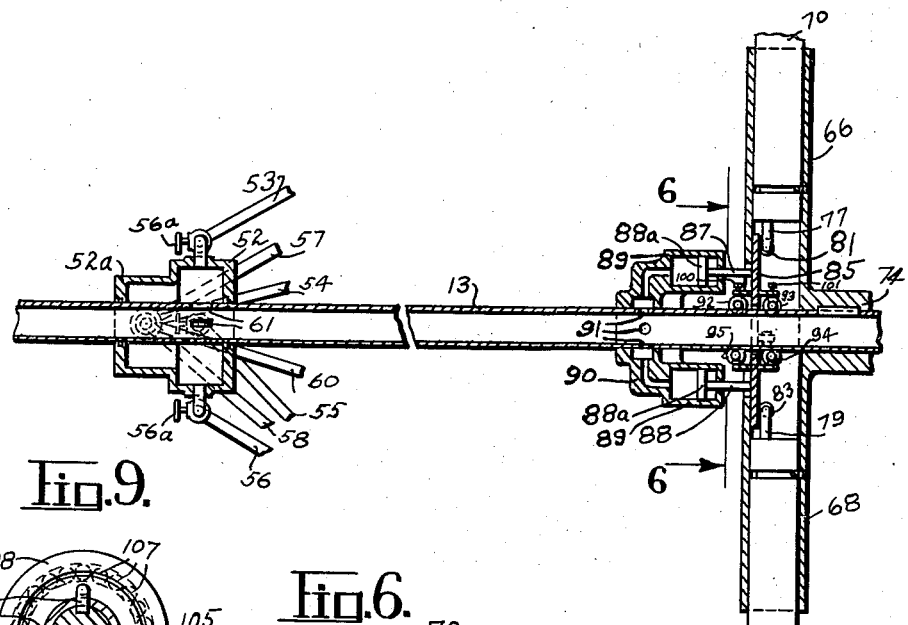
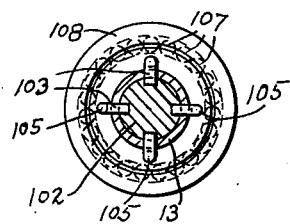
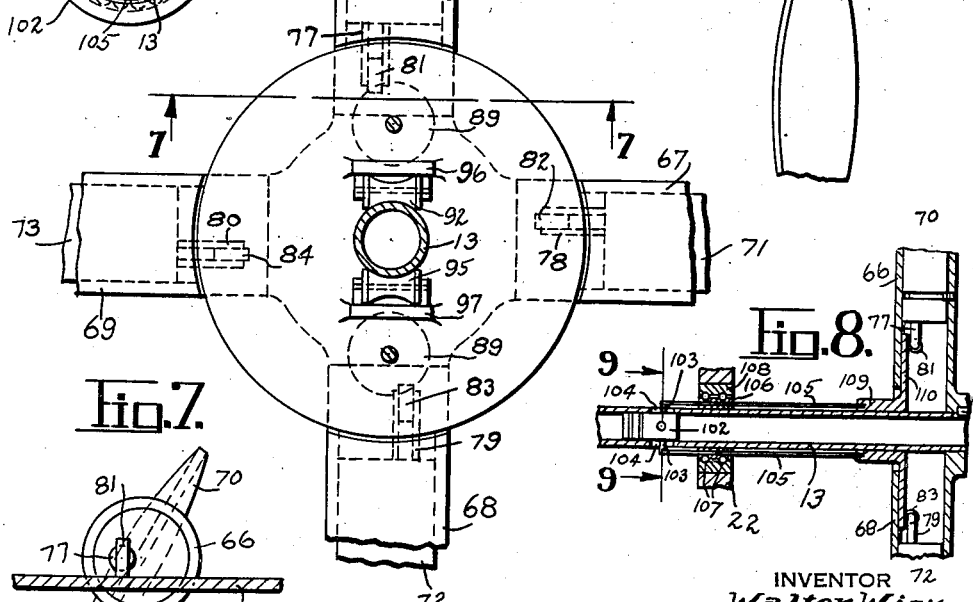
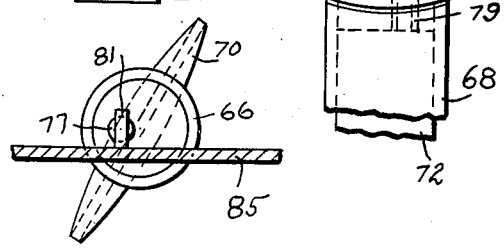
INVENTOR
*Walter Wisk.*
BY *H. G. Manning*
ATTORNEY Patented Mar. 7, 1944

2,343,606

UNITED STATES PATENT OFFICE 2,343,606

MULTIMOTOR SINGLE PROPELLER AIRPLANE

Walter Wisk, West Cromwell, Conn.

Application September 17, 1941, Serial No. 411,183

3 Claims. (Cl. 244—55)

This invention relates to airplanes, and more particularly to an airplane employing a plurality of air-cooled motors arranged for driving a single propeller.

One object of this invention is to provide an airplane of the above nature in which the hydraulic pressure developed in the crank cases of all of the motors is transmitted by suitable pipes to the common propeller shaft and the resultant pressure is transmitted thence to the automatic propeller pitch-controlling mechanism.

Another object of this invention is to provide an airplane of the above nature in which each of the motors is located in a separate compartment through which air from the cowl is selectively passed for cooling the motors, but in which the flow of air to any particular motor may be stopped by the closing of shutters in case it is desired to make repairs to any motor during flight.

A further object of this invention is to provide an airplane of the above nature which will be relatively simple in construction, inexpensive to manufacture, easy to manipulate, compact, ornamental in appearance, subject to the minimum of vibration, and very efficient and durable in use.

With these and other objects in view, there have been illustrated on the accompanying drawings several forms in which the invention may be conveniently embodied in practice.

In the drawings:

Figure 5 is a sectional view, on an enlarged scale, of a modified form of the invention, showing the mechanism for transmitting the hydraulic pressure developed in the crank cases of each of the motors to the propeller pitch controlling mechanism.

Figure 6 is a sectional view taken along the line 6—6 of Figure 5, looking forwardly.

Figure 7 is a sectional view taken along the line 7—7 of Figure 6, looking outwardly at the inner end of one of the propeller blades.

Figure 8 is a sectional view of a modified form of mechanism for transmitting the hydraulic pressure from the interior of the hollow transmission shaft to the propeller pitch controlling mechanism.

Figure 9 is a sectional view taken along the line 9—9 of Figure 8, looking forwardly.

Figure 1:
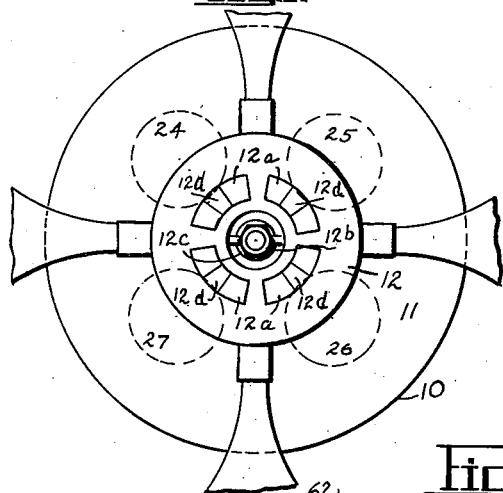
Figure 1 represents a front view of the central part of an airplane showing the cowl, the fuselage and the inner ends of the propeller blades.

Referring now to the drawings wherein like reference numerals denote corresponding parts throughout the several views, the numeral 10 indicates an airplane fuselage which, as shown, is cylindrical in shape except for a conical forward end 11 thereof, which is closed by a streamlined rotating cowl 12, the latter having a plurality of central air intake openings 12a and being rigidly secured to the forward end of a common hollow transmission shaft 13 by means of a nut 12b which is seated within a recess 12c in the forward part of said cowl. Behind each intake opening 12a, provision is made of a fan blade 12d which increases the amount of air drawn through the cowl 12.

The interior of the fuselage is divided into a plurality of longitudinal compartments (four in this instance) designated by the numerals 14, 15, 16, and 17. These compartments are separated from each other by four U-shaped partitions 18, 19, 20, and 21, the inner adjacent sections of which are spaced from the common central transmission shaft 13—the latter being mounted in ball bearings 22 and 23 which are supported from the exterior of the fuselage 10 by two sets of rearwardly diverging arms 22a and 22b, respectively.

Figure 4:
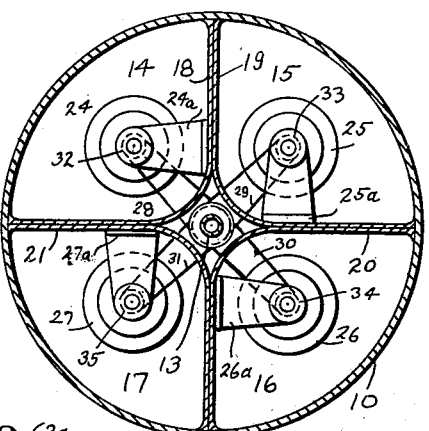
Figure 4 is a transverse sectional view taken along the line 4—4 of Figure 2, looking rearwardly.

The airplane is driven by four air-cooled motors 24, 25, 26, and 27, which are supported within their respective compartments by means of four angle bracket members 24a, 25a, 26a, and 27a, respectively (see Figure 4). Power is transmitted from all of the motors to the common transmission shaft 13 by means of four belts 28, 29, 30, and 31, which run over four pulleys 32, 33, 34, and 35, carried by said motors and four pulleys 36, 37, 38, and 39 mounted on the main shaft. Provision is made of slip-friction mechanisms for so connecting the pulleys 36, 37, 38, and 39 with the shaft that in case one of the motors is idling or stopped, slippage will occur between the pulley and belt connected with said motor.

The front of each compartment is enclosed by four sets of inclined flat shutters 40, 41, 42, and 43, which shutters are controlled in their opening and closing movements by flexible cables 44, 45, 46, and 47. The cables are provided with handles 48, 49, 50, and 51 on the inner ends thereof for convenience in manipulation.

The inclined rear walls of the compartments 14, 15, 16, and 17, are closed by inwardly opening doors 63 located in the outer portions 64 of the support members 22a—thus permitting access to said compartments from the rear portion of the fuselage. Provision is also made of rear outlet openings 62 in the outer walls of the fuselage 10 to permit the cooling air to flow outwardly from said compartments 14, 15, 16, and 17. Air outlet openings 62a are also provided in the fuselage in front of the inclined wall in which the shutters are located.

Figure 2:
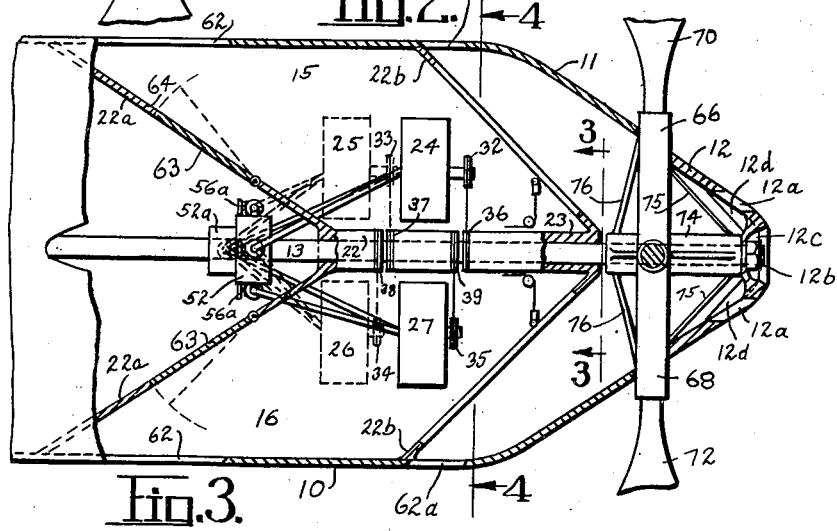
Figure 2 is a longitudinal sectional view through the forward part of the fuselage and cowl.
Figure 3:
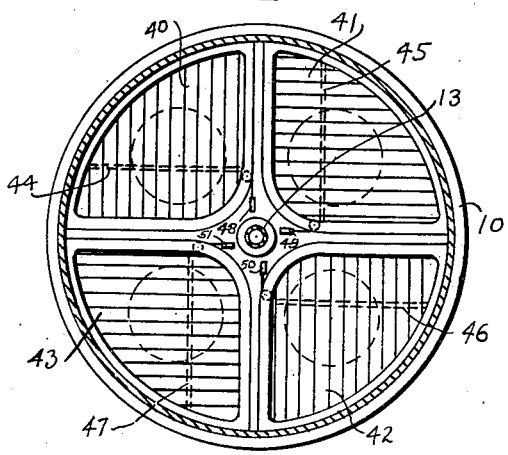
Figure 3 is a transverse sectional view taken along the line 3—3 of Figure 2, looking rearwardly.

The hydraulic pressure developed in the crank cases of each of the motors 24, 25, 26, and 27 is transmitted to a common manifold 52 having a reduced rear section 52a (see Figures 2 and 5). The forward part of the manifold 52 is connected to the crank cases of the motors 24, 25, 26, and 27, respectively, by a plurality of oil inlet pipes 53, 54, 55, and 56, individually controlled by hand-operated valves 56a. The oil is pumped back from the manifold 52 to the respective motor crank cases through a plurality of oil return pipes 57, 58, 59, and 60, which are connected to the reduced rear section of said manifold.

The transmission pipe 13 is provided with a plurality of spaced slots 61 (see Figure 5), which are located within the enlarged section of the manifold 52, whereby the resultant pressure from all of the motors will be transmitted through the common shaft 13 to the mechanism at the front of the airplane for automatically controlling the pitch of the propeller blades in accordance with the total crank case oil pump pressure developed by all of said motors. If desired, an additional main control valve, not shown, may be provided in the manifold 52 between the inlet and outlet ports thereof, whereby the operator may manually adjust the hydraulic pressure which will be transmitted to the pitch control mechanism.

As is clearly shown in Figures 5, 6, and 7, the propeller is provided with four radial hubs 66, 67, 68, and 69 within which are mounted four twistable adjustable blades 70, 71, 72, and 73. The hubs 66, 67, 68, and 69 are connected to a longitudinal sleeve 74 mounted upon and rigidly connected with the transmission shaft 13 by means of a plurality of inclined forward struts 75 and a plurality of inclined rearward struts 76. By means of this construction, it will be seen that the cowl and blade holding hubs of the single propeller will rotate in unison with the shaft 13 which receives power jointly from the four motors of the airplane.

In the modified form of the invention shown in Figures 5, 6, and 7, provision is made of rollers 81, 82, 83, and 84 mounted to rotate within the ends of four pins 77, 78, 79, and 80, eccentrically located on the inner ends of the propeller blades 70, 71, 72, and 73, respectively. The rollers 81, 82, 83, and 84 (as clearly shown in Figure 5), are adapted to be engaged by a sliding plate member 85 which rotates with the shaft 13 and is engaged by a pair of longitudinal rods 87, 88, each rod being connected to a piston 89 mounted in one of two cylinders 90 communicating with a common jacket 90, which is in alinement with a plurality of openings 91 in the transmission shaft 13.

In order to guide the rotary plate 85 in its longitudinal movements along the exterior of the shaft 13, provision is made of two pairs of concave spools 92, 93, and 94, 95, respectively, which engage said shaft and are mounted to rotate within a pair of bracket members 96 and 97 secured to the front and rear of said plate, respectively. The concave spools are adjustable with respect to the shaft 13 by means of two pairs of headed screws 100 and 101 (as clearly shown in Figure 5).

In the modified form of the invention shown in Figures 8 and 9, the pressure from the interior of the hollow shaft 13 is transmitted to the controlled-pitch propeller blades 70, 71, 72, and 73 by means of an interior piston 102 having four radial arms 103 connected therewith and extending through a plurality of elongated slots 104 formed in the shaft 13. The outer ends of the arms 103 are connected to the rear ends of a plurality of longitudinal rods 105 which are located outside the shaft 13 and are free to slide within the inner raceway 106 of the ball bearings surrounding said shaft 13, one such ball bearing being shown in Figures 8 and 9—the balls being indicated by the numeral 107, and the outer raceway by the numeral 108. The forward ends of the rods 105 are connected to a sleeve 109 extending rearwardly from a plate 110 slidably mounted upon the exterior of said shaft 13. This operation of this form of invention is similar to that shown in Figures 5, 6, and 7.

While there have been disclosed in this specification several forms in which the invention may be embodied, it is to be understood that these forms are shown for the purpose of illustration only, and that the invention is not to be limited to the specific disclosures, but may be modified and embodied in various other forms without departing from its spirit. In short, the invention includes all modifications and embodiments coming within the scope of the following claims.

Having thus fully described the invention, what is claimed as new and for which it is desired to secure Letters Patent, is:

1. In an airplane having a fuselage compartment and a propeller, a sector-shaped motor housing in said fuselage compartment, said compartment having a U-shaped inner wall and a circular outer wall, said compartment also having a rear ventilation outlet, an adjustable air inlet at the forward part of said compartment, and an apertured cowl connected for rotation with said propeller for delivering air to said inlet.

2. A motor compartment as defined in claim 1, in which means are provided for manually adjusting said air inlet.

3. An airplane as defined in claim 1 in which an air outlet is provided in front of said inlet at the side of the airplane body.

WALTER WISK.